No. 893,281.  
PATENTED JULY 14, 1908.  
B. F. TEAL.  
UNIVERSAL JOINT.  
APPLICATION FILED FEB. 21, 1907. RENEWED DEC. 16, 1907.
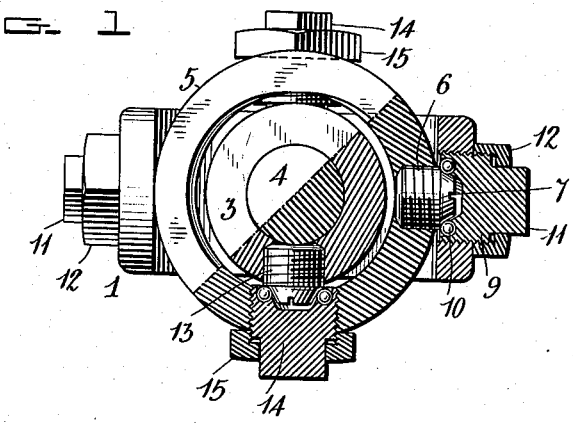
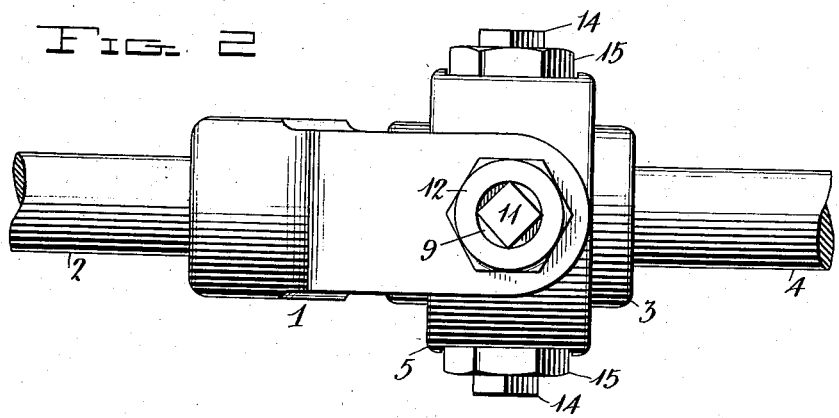
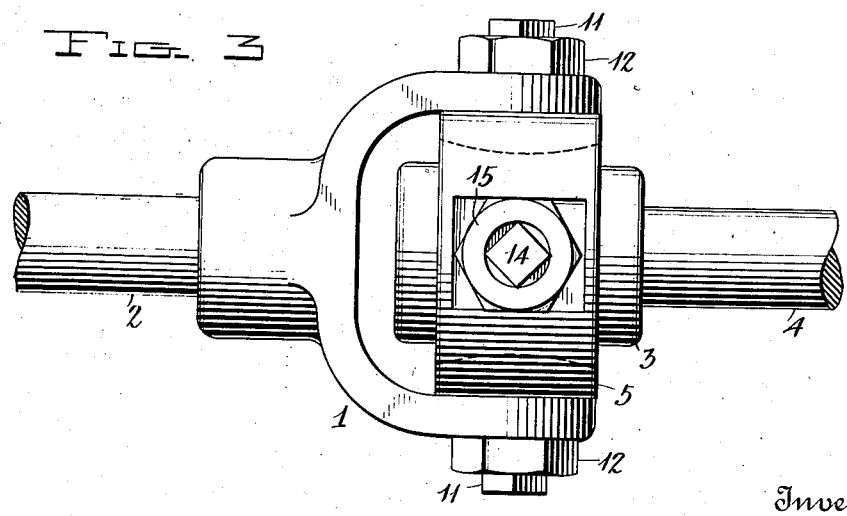
Witnesses
Inventor  
Benjamin F. Teal  
by  
Attorneys

UNITED STATES PATENT OFFICE.

BENJAMIN F. TEAL, OF GLENSIDE, PENNSYLVANIA.

UNIVERSAL JOINT.

No. 893,281. Specification of Letters Patent. Patented July 14, 1908.

Application filed February 21, 1907, Serial No. 358,679. Renewed December 16, 1907. Serial No. 406,771.

*To all whom it may concern:*

Be it known that I, BENJAMIN F. TEAL, a citizen of the United States, residing at Glenside, in the county of Montgomery and State of Pennsylvania, have invented certain new and useful Improvements in Universal Joints; and I do declare the following to be a full, clear, and exact description of the invention, such as will enable others skilled in the art to which it appertains to make and use the same.

This invention relates to universal joints.

The object of the invention is in a thoroughly feasible and practical manner to reduce to the minimum, the friction between the movable parts; largely to increase the angle at which the parts may be driven and be made to do effective work; to dispense with the ordinary rigid trunnions such as have heretofore been used, and in lieu thereof to provide novel and practical adjustable antifriction bearings between the ring and yoke and the head; and, generally, to improve and increase the efficiency of universal joints.

The invention consists further in certain novel details of construction of a universal joint that will be hereinafter fully described and claimed.

In the drawings, forming a part of this specification, and in which like characters of reference indicate corresponding parts, Figure 1 is a view in end elevation, partly in section, of a universal joint constructed in accordance with the present invention; Fig. 2 is a view in side elevation thereof; and Fig. 3 is a view in plan.

The joint comprises, as usual, a yoke 1 with which is connected a driving shaft 2, a head 3 with which is connected a driven shaft 4, and a ring 5. These parts, with the exception of certain changes in their construction to adapt them to receive the improvements of the present invention may be of the usual or any preferred construction, and therefore need no detailed description.

The feature of the present invention which differentiates this particular joint from those in common use is that there is a novel form of trunnion employed for connecting the ring and yoke and the head and the ring, the object of which is to reduce friction, and to permit of a greater range of angular adjustment of the members of the joint than is possible with the ordinary form of joint in which the trunnions are provided with plain journals subjected to sliding friction. The form of antifriction bearings between the head and ring, and the ring and the yoke are preferably the same, thus to render the parts interchangeable, thus to facilitate repairs when necessary.

As shown in Fig. 1, the ring has combined with it in diametrical alinement, two trunnions 6 which are threaded into the ring, thus to permit of adjustment, the outer end of each of the trunnions being provided with a nick 7 to receive a screw-driver or other appropriate implement for seating the member. The outer end of each trunnion is reduced and projects into a concavity or socket formed on the inner end of a ball-race member 9, and in the concavity, which is appropriately contoured for the purpose, is disposed a series of bearing-balls 10 that are engaged by the reduced outer end of the trunnion. The race member 9 is threaded into an opening in the yoke, and is provided with a squared outer terminal 11 by which the race may be assembled with or detached from the yoke by the employment of a suitable wrench. In order to lock the race in its adjusted position, a locking nut 12 is provided which fits over the outer end of the race and is screwed on to the threaded portion thereon. The trunnions 13 and race 14 and locking nut 15 of the head and the ring are preferably of the same construction as those just described and operate in precisely the same manner, so that a reiteration of the description of these parts is unnecessary.

It will be seen from the foregoing description, that accurate adjustments of the trunnions and the races may be secured not only for the purpose of centering and for reducing friction, but also to take up any lost motion, so that steady and positive operation of the coupling may at all times be secured.

Having thus described my invention, what I claim as new is,—

1. A universal joint comprising, a yoke, an element, an oscillatory member interposed between the yoke and element, adjustable trunnions carried by said element and oscillatory member, race members carried by the yoke and oscillatory member for engagement with the corresponding trunnions, and antifriction balls arranged between said trunnions and race members.

2. A universal joint comprising, a yoke, an element, an oscillatory member interposed between the yoke and element, adjustable trunnions carried by said member and element, adjustable race members carried by the yoke and oscillatory member for coöperation with the corresponding trunnions, anti-friction balls arranged between the trunnions and race members, and means for locking said members against movement.

3. A universal joint comprising, a yoke, an element, an oscillatory ring interposed between the yoke and element, adjustable trunnions carried by the element and ring, adjustable race members carried by the latter and yoke for coöperative engagement with the corresponding trunnions, and anti-friction balls arranged between the trunnions and race members.

In testimony whereof I have hereunto set my hand in presence of two subscribing witnesses.

BENJAMIN F. TEAL.

Witnesses:
   CLINTON A. SOWERS,
   J. KIRK SHOESTER.